(12) United States Patent
Minkara et al.

(10) Patent No.: US 12,435,002 B2
(45) Date of Patent: Oct. 7, 2025

(54) METHODS AND SYSTEMS FOR CONTROLLING CARBON BURN OUT

(71) Applicant: EM RESOURCES LLC, South Jordan, UT (US)

(72) Inventors: Rafic Y. Minkara, Kennesaw, GA (US); Joseph W. Cochran, Palm Harbor, FL (US)

(73) Assignee: EM Resources LLC, South Jordan, UT (US)

( * ) Notice: Subject to any disclaimer, the term of this patent is extended or adjusted under 35 U.S.C. 154(b) by 0 days.

(21) Appl. No.: 18/241,365

(22) Filed: Sep. 1, 2023

(65) Prior Publication Data

US 2023/0406766 A1 Dec. 21, 2023

Related U.S. Application Data

(63) Continuation of application No. 17/436,310, filed as application No. PCT/US2020/020803 on Mar. 3, 2020, now Pat. No. 11,753,338.

(Continued)

(51) Int. Cl.
*F27B 15/00* (2006.01)
*C04B 18/08* (2006.01)
(Continued)

(52) U.S. Cl.
CPC ............ *C04B 18/08* (2013.01); *C04B 20/04* (2013.01); *F23G 5/08* (2013.01);
(Continued)

(58) Field of Classification Search
CPC . C04B 18/08; C04B 20/04; F23G 5/08; F23G 2209/12; F23G 2209/30; F27B 15/00; F23C 10/00; F23C 2206/103
See application file for complete search history.

(56) References Cited

U.S. PATENT DOCUMENTS

| | | | | |
|---|---|---|---|---|
| 5,399,194 A | * | 3/1995 | Cochran | .............. F27B 15/00 106/478 |
| 6,907,994 B2 | * | 6/2005 | Bradley | ................ B03B 9/04 209/11 |

(Continued)

FOREIGN PATENT DOCUMENTS

| | | |
|---|---|---|
| JP | 2008-126117 A | 6/2008 |
| JP | 2019-005703 A | 1/2019 |
| WO | 2013-106835 A1 | 7/2013 |

OTHER PUBLICATIONS

McCarthy et al., "Dry-processing of long-term wet-stored fly ash for use as an addition in concrete", Cement and Concrete Composites, 2018, pp. 205-215, 11 pages.

*Primary Examiner* — Gregory A Wilson
(74) *Attorney, Agent, or Firm* — Hayes Soloway PC

(57) ABSTRACT

Systems and methods for beneficiating a recovered fly ash material and/or recovering fly ash from an impound site are described. The method may include thermally treating a first portion of a recovered fly ash material to form a thermally treated fly ash having a first temperature of at least 1000° F., and contacting the thermally treated fly ash with a second portion of the recovered fly ash material to cool the thermally treated fly ash to a second temperature of less than or equal to 500° F. and form a fly ash product. The fly ash product may have a carbon content less than 8% by weight, based on the total dry weight of the fly ash product.

9 Claims, 1 Drawing Sheet

Related U.S. Application Data

(60) Provisional application No. 62/814,109, filed on Mar. 5, 2019.

(51) Int. Cl.
 *C04B 20/04* (2006.01)
 *F23G 5/08* (2006.01)
 *C04B 111/10* (2006.01)

(52) U.S. Cl.
 CPC ... *C04B 2111/1093* (2013.01); *F23G 2209/12* (2013.01); *F23G 2209/30* (2013.01)

(56) References Cited

U.S. PATENT DOCUMENTS

| | | | |
|---|---|---|---|
| 7,047,894 | B2 | 5/2006 | Crafton et al. |
| 7,223,375 | B1 | 5/2007 | Cochran |
| 7,306,200 | B2 | 12/2007 | Cochran |
| 7,641,878 | B2 * | 1/2010 | Cochran ................ C04B 18/08 106/478 |
| 7,670,424 | B2 * | 3/2010 | Cochran ................ C04B 18/08 264/DIG. 49 |
| 7,703,403 | B2 | 4/2010 | Giampa et al. |
| 7,867,462 | B2 | 1/2011 | Cochran |
| 8,936,677 | B2 | 1/2015 | Vazquez Favela et al. |
| 2003/0089642 | A1 | 5/2003 | Bradley et al. |
| 2004/0033184 | A1 * | 2/2004 | Greer ..................... C04B 18/08 423/215.5 |
| 2008/0173217 | A1 | 7/2008 | Cochran |
| 2013/0125799 | A1 | 5/2013 | Fried et al. |

\* cited by examiner

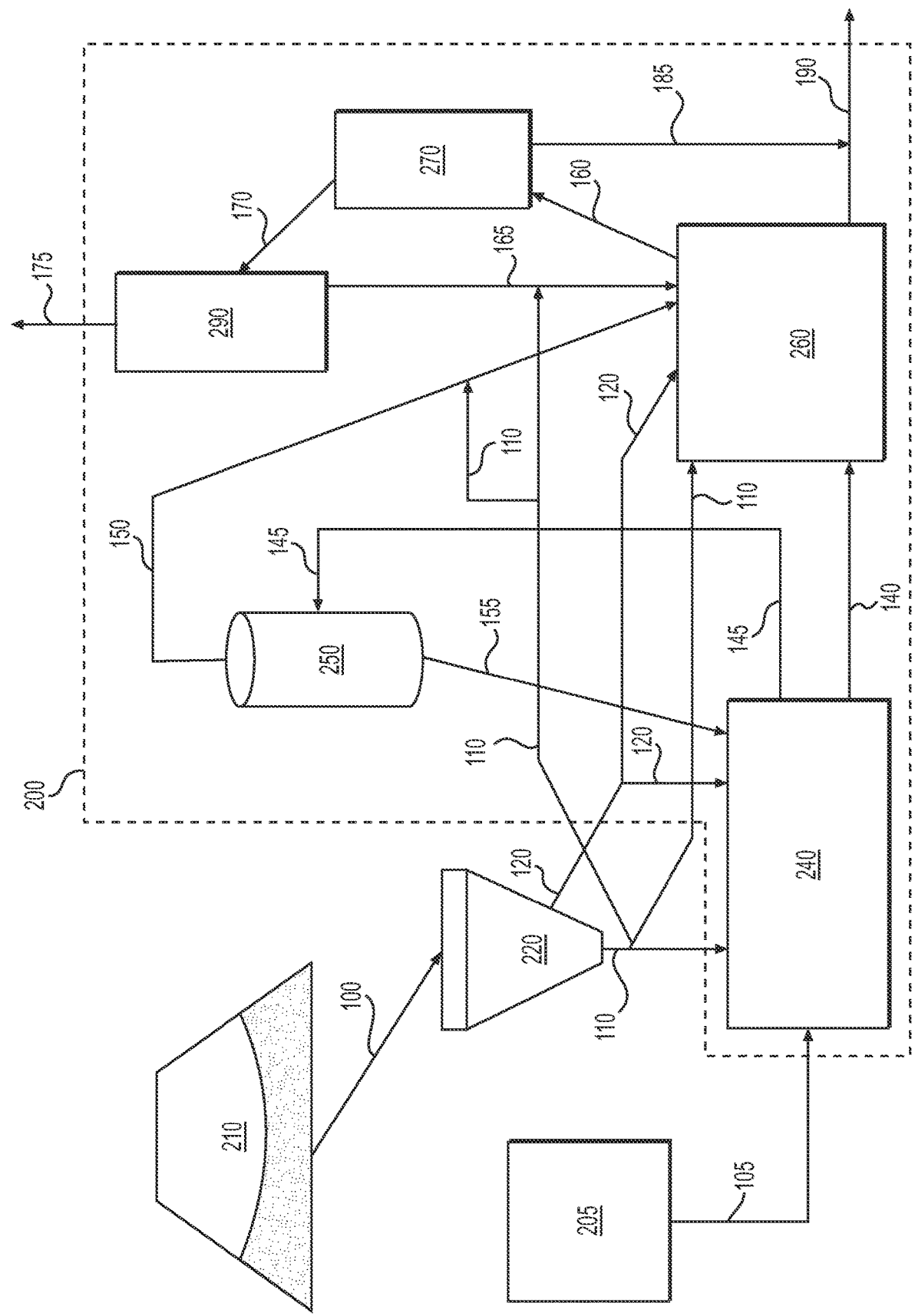

METHODS AND SYSTEMS FOR CONTROLLING CARBON BURN OUT

CROSS REFERENCE TO RELATED APPLICATIONS

This application is a Continuation of U.S. patent application Ser. No. 17/436,310, filed on Sep. 3, 2021, which is the U.S. national phase entry under 35 U.S.C. § 371 of International Application No. PCT/US2020/020803, filed on Mar. 3, 2020, which claims priority to U.S. Provisional Application No. 62/814,109, filed on Mar. 5, 2019, each of which is incorporated by reference herein in its entirety.

FIELD

This application generally relates to methods of reclaiming combustion byproducts. More specifically, this application relates to systems and methods for reclaiming and beneficiating fly ash.

BACKGROUND

The process of burning coal in utility, steel mill, and other large industrial furnaces generates coal ash, including fly ash. Fly ash has long been considered a waste product to be deposited in landfills and other impoundment sites. Fly ash particles have a composition related to the chemical composition of the coal burned in the generation of the fly ash. Fly ash can contain minerals and heavy metals that present environmental concerns and make treatment and disposal inefficient and cost intensive. Fly ash is also desirable as a supplementary cementitious material for use in concrete as a partial replacement for cement and to enhance the durability and chemical resistance and long term strength gain of concrete.

Landfills, ponds, and other impoundment sites (e.g., impoundments) have historically stored mass quantities of fly ash. Storm water that comes in contact with ash in a landfill or pond (e.g., contact water) may contain trace elements such as arsenic, selenium, boron, mercury, antimony, barium, beryllium, cadmium, chromium, lead, nickel, silver, and/or thallium. By some estimates, one inch of rain can generate 27,000 gallons of contact water per acre of impounded fly ash. Contact water may carry trace residues of the above-listed elements into ground water, surface water, or other nearby water reservoirs. According to regulation from the Environmental Protection Agency, contact water or other metal contaminated water must be stored and treated before disposal. Ponds often include a mixture of contaminated water (e.g., contact water) and wet fly ash. The wet fly ash contains an aqueous component and is usually unusable as building material due to its moisture content and carbon content.

SUMMARY

The present disclosure includes methods for recovering fly ash, methods for beneficiating recovered fly ash material, and carbon burn out systems for recovering fly ash. For example, the present disclosure includes methods of beneficiating recovered fly ash material which may comprise thermally treating a first portion of the recovered fly ash material to form a thermally treated fly ash having a first temperature of at least 1000° F., and contacting the thermally treated fly ash with a second portion of the recovered fly ash material to cool the thermally treated fly ash to a second temperature of less than or equal to 500° F. and form a fly ash product, wherein the fly ash product has a carbon content less than or equal to 8% by weight, based on the total dry weight of the fly ash product. Contacting the thermally treated fly ash with a second portion of the recovered fly ash material may include mixing the thermally treated fly ash with the second portion of the recovered fly ash material in a ribbon mixer or rotating drum. A temperature difference between the first portion of the recovered fly ash material and the second portion of the recovered fly ash material may be at least 20° F. The recovered fly ash material may be obtained from an impound site and the method may further comprise separating the recovered fly ash material into a first portion and the second portion, wherein the first portion comprises wet fly ash and the second portion comprises an aqueous solution. The aqueous solution may include at least one trace metal contaminant. The first portion of the recovered fly ash material may be thermally treated in a combustion chamber, and the method may further include introducing the aqueous solution into the combustion chamber before, after, or during thermal treatment of the first portion of the recovered fly ash material. The aqueous solution may include a liquid portion that at least partially vaporizes in the combustion chamber, and a solid portion that is present in the fly ash product. The carbon content of the thermally treated fly ash may be less than or equal to 6% by weight, based on the total dry weight of the thermally treated fly ash. The carbon content of the first portion of recovered fly ash material may be greater than or equal to 10% by weight, based on the total dry weight of the first portion of the recovered fly ash material.

Further disclosed herein are methods for recovering fly ash from an impound site. For example, the methods may include separating a recovered fly ash material obtained from the impound site into an aqueous component and a wet fly ash component, thermally treating a first portion of the wet fly ash component in a carbon burn out system to form a thermally treated fly ash, and controlling a temperature of the carbon burn out system with at least a portion of the aqueous component. The method may further include mixing the thermally treated fly ash and a second portion of the wet fly ash component to form an ash product, wherein the thermally treated fly ash has a lower carbon content than the recovered fly ash material, and the ash product has a carbon content less than or equal to 6% by weight, based on the total dry weight of the ash product. The ash product may exit from the carbon burnout system having a temperature at least 300° F. cooler than a temperature of the thermally treated fly ash. Mixing the thermally treated fly ash and the second portion of the wet fly ash component may release a gas and the methods herein may further include passing the released gas through a scrubber. The first potion of the wet fly ash component may be thermally treated in a combustion chamber of the carbon burn out system, and a temperature of the combustion chamber may be maintained at 1300° F.±100° F. Controlling the temperature of the carbon burn out system may include introducing the aqueous component into the combustion chamber. The recovered fly ash may have a carbon content less than or equal to 8% by weight, based on the total dry weight of the recovered fly ash and the method may further include mixing the wet fly ash component with an auxiliary fuel (e.g., gaseous or liquid fuel) prior to thermally treating the first portion of the wet fly ash component.

Further disclosed herein are carbon burn out systems for recovering fly ash. For example, the carbon burn out system may include a combustion chamber for thermally treating fly ash, a mixing chamber in communication with, and downstream from, the combustion chamber, and a source of recovered fly ash material for controlling a temperature of the carbon burn out system, at least a portion of the recovered fly ash material may be in communication with (a) an inlet of the combustion chamber, and (b) an inlet of the mixing chamber. The portion of the recovered fly ash material in communication with the combustion chamber and the mixing chamber may include an aqueous solution and/or wet recovered fly ash having a carbon content of at least 8% by weight, relative to the total dry weight of the wet recovered fly ash. One or both of the combustion chamber and the mixing chamber may not have a cooling jacket. The system may further include a scrubber in communication with, and downstream from, the mixing chamber.

Embodiments of the present disclosure may result in lower capital and operating costs as well as a reduction in the volume of contact water that must be treated and discharged as compared to existing carbon burn out systems. Other advantages and benefits will be apparent to one skilled in the art when reviewing the specification in combination with the drawings as described herein.

BRIEF DESCRIPTION OF THE DRAWINGS

Embodiments of the present disclosure may be implemented in connection with aspects illustrated in the attached drawings.

FIG. 1 is a schematic diagram of an exemplary system for beneficiating recovered fly ash, according to one or more embodiments of the present disclosure.

DETAILED DESCRIPTION

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. All ranges are understood to include endpoints, e.g., an average particle size between 1 mm and 50 mm includes 1 mm, 50 mm, and all values between.

The systems and methods of the present disclosure may be useful for reclaiming and beneficiating combustion byproducts such as fly ash, e.g., rendering such materials suitable for other uses. The present disclosure also may provide environmental benefits by recycling and reusing byproducts while providing a more efficient and/or more cost effective method of reclaiming fly ash. The methods herein may remediate fly ash from landfill and impoundments in an environmentally desirable manner, e.g., by minimizing the release of contact water and/or capturing contaminants from the contact water for ultimate sequestering. For example, the fly ash product may be sequestered into concrete. The methods herein include converting the reclaimed ash into a value added product, e.g., for use in concrete.

The systems herein, e.g., carbon burn out systems, may include at least a combustion chamber, e.g., for thermally beneficiating fly ash, and a source of recovered fly ash material. The recovered fly ash material may undergo thermal treatment (e.g., reducing carbon and/or water content) and/or may be used to help control the temperature of the system. For example, the recovered fly ash material may be used to control (e.g., decrease) the temperature of the combustion chamber and/or other components of the system. In some examples, the system does not include a shell/tube heat exchanger, cooling jacket, or similar product cooler. For example, the recovered fly ash material stream may serve to control the temperature of the system, thus avoiding the complication and cost of installing a product cooler (e.g., a shell product cooler or a tube product cooler). The fly ash product produced by the system may have a carbon content and/or water content less than the respective carbon content and water content of the recovered fly ash material.

In some aspects of the present disclosure, the system is configured for installation and use in a variety of locations, including sites (e.g., impoundments) far from operating power plants. For example, the systems herein may be suitable for use near a pond, landfill, or other impound site that contains coal ash, e.g., fly ash, and other byproducts of combustion. Thus, the systems herein may be suitable for use independent of a utility or other energy generating facility.

The following discussion makes reference to an exemplary system for beneficiating fly ash (e.g., recovered fly ash), shown in FIG. 1. The system for beneficiating fly ash may include a carbon burn out system 200. Other systems encompassed herein may include more or fewer components than those illustrated in FIG. 1, and/or the components may be assembled in a different configuration or used in a different sequence while still performing the methods herein. The arrows shown in FIG. 1 depict a general "downstream" direction. For example, the arrow depicting the thermally treated fly ash 140 stream (described below) indicates that material is passed from combustion chamber 240 to mixing chamber 260 (which additionally may provide cooling, as discussed below), e.g., mixing chamber 260 is downstream of combustion chamber 240. Recycle streams, e.g., streams that bring materials from a downstream component of the system to an upstream component, are also shown in FIG. 1.

As shown in FIG. 1, a stream of recovered fly ash material 100 may be obtained from an impound site 210, such as a coal ash pond or landfill used to store coal ash waste generated from a power plant. Fly ash is generally produced from the combustion of pulverized coal, and may comprise silicon species (e.g., silica ($SiO_2$)), aluminum species (e.g., alumina ($Al_2O_3$)), and/or calcium species (e.g., calcium oxide (CaO)), among other possible species. The term "recovered fly ash material" includes material harvested or otherwise recovered from an impound site that comprises fly ash, water (including water in hydrate complexes), and optionally one or more other combustion byproducts, such as trace metals, sulfur, halides, etc. The recovered fly ash material 100 may comprise one or more trace metals, such as, e.g., arsenic, selenium, boron, mercury, antimony, barium, beryllium, cadmium, chromium, lead, nickel, silver, and/or thallium.

The recovered fly ash material 100 may have a carbon content greater than or equal to 1% by weight, such as, for example, greater than or equal to 2% by weight, greater than or equal to 3% by weight, greater than or equal to 4% by weight, greater than equal to 5% by weight, greater than or equal to 6% by weight, greater than or equal to 7% by weight, greater than or equal to 8% by weight, greater than or equal to 10% by weight, or greater than or equal to 15% by weight, based on the total dry weight of the recovered fly ash material 100. For example, the recovered fly ash material 100 may have a relatively high carbon content of 7% to 20% by weight, such as, for example, 8% to 15% by weight, or 12% to 20% by weight, based on the total dry weight of the recovered fly ash material 100.

In some examples, the recovered fly ash material 100 may have a carbon content of less than 8% by weight, less than 7% by weight, less than 6% by weight, less than 5% by weight, less than 4% by weight, less than 3% by weight, less than 2% by weight, or less than 1% by weight, based on the total dry weight of the recovered fly ash material 100. For example, the recovered fly ash material 100 may have a carbon content of 1% to 8% by weight, or 4% to 8% by weight. In some cases, e.g., when the carbon content of the recovered fly ash material 100 is relatively low, the combustible content (e.g., carbon content) of the mixture within combustion chamber 240 may be supplemented by an auxiliary fuel 105. Auxiliary fuel 105 may be introduced into carbon burn out system 200 (e.g., into combustion chamber 240) from an auxiliary fuel storage unit 205. Exemplary auxiliary fuels 105 may include, for example, natural gas, coal fines, liquid fuel, liquid propane, and/or other carbonaceous materials or mixtures thereof. In some embodiments, auxiliary fuel 105 may supplement the calorific content of the mixture within combustion chamber 240.

In some examples, one or more separation unit(s) 220 may be used to process the recovered fly ash material 100, such as by separating the recovered fly ash material 100 into its liquid and solid components, e.g., contact water 110 and wet recovered fly ash 120. The wet recovered fly ash 120 and/or the contact water 110 then may be introduced to the carbon burn out system 200 as discussed below. The one or more separation unit(s) 220 may include, for example, a sieve, a magnetic trap, a screen, a settler of settling pond, a clarifier, a filter press, a dryer, or combinations thereof. Separating the wet recovered fly ash 120 from the contact water 110 may include at least partially drying the wet recovered fly ash 120. In some aspects, the wet recovered fly ash 120 may be passed through a dryer (e.g., a dryer of separation unit(s) 220) after separating the wet recovered fly ash 120 from contact water 110 to remove residual water and/or to reduce the water content to a desired level. For example, the wet recovered fly ash 120 may be passed through a dryer to reduce the water content of the wet recovered fly ash 120 to less than 40% by weight, such as less than 30%, less than 20%, less than 10%, or less than 5% by weight water, with respect to the total weight of the wet recovered fly ash 120. In some examples, the wet recovered fly ash 120 obtained from the separation unit(s) 220 may have a water content of greater than 0% to 10% (e.g., 0.1% to 10% or 0.5% to 5%) by weight water, based on the total weight of the wet recovered fly ash 120, to facilitate handling and metering into the combustion chamber 240. Thus, for example, the wet recovered fly ash 120 may have a water content of greater than 0% to 40% by weight, such as, for example, 5% to 30% by weight, or 15% to 25% by weight, based on the total weight of the wet recovered fly ash 120.

In addition or alternatively, one or more other streams, such as, for example large-sized fly ash 155, scrubber blowdown 165, and/or dust 185 may be passed through a dryer. This may involve the implementation of one or more dryers configured to use thermal energy from the combustion chamber 240 and/or mixing chamber 260 to dry a desired composition. The passing of one or more of the aforementioned streams through a dryer may reduce the water content of the one or more streams.

The wet recovered fly ash 120 may have a carbon content greater than or equal to 1% by weight, including, for example, greater than or equal to 2% by weight, greater than or equal to 3% by weight, greater than or equal to 4% by weight, greater than equal to 5% by weight, greater than or equal to 6% by weight, greater than or equal to 7% by weight, greater than or equal to 8% by weight, greater than or equal to 10% by weight, or greater than or equal to 15% by weight, based on the total dry weight of the wet recovered fly ash 120. In some examples, the wet recovered fly ash 120 may have a carbon content of less than 8% by weight, less than 7% by weight, less than 6% by weight, less than 5% by weight, less than 4% by weight, less than 3% by weight, less than 2% by weight, or less than 1% by weight, based on the total dry weight of the wet recovered fly ash 120. For example, the wet recovered fly ash 120 may have a carbon content of 1% to 8% by weight, or 4% to 8% by weight.

The wet recovered fly ash 120 may be stored in an enclosure, silo, or other reservoir prior to entering system 200. Similarly, the contact water 110 may be stored in a pond, silo, or other reservoir prior to entering system 200. While FIG. 1 shows the separation unit(s) 220 outside carbon burn out system 200 (e.g., the recovered fly ash material 100 processed via the separation unit(s) 220 to produce wet recovered fly ash 120 prior to introducing the wet recovered fly ash 120 into the system 200), in some examples, the one or more separation unit(s) 220 are components of the system. For example, the recovered fly ash material 100 may enter the system via the separation unit(s) 220 to produce separate streams or sources of wet recovered fly ash 120 and contact water 110, which further pass through system 200 as discussed below.

As shown, the carbon burn out system 200 includes a combustion chamber 240, a mixing chamber 260, a hot cyclone 250, a dust collector 270, and a scrubber 290. The wet recovered fly ash 120 may be introduced into combustion chamber 240 and/or mixing chamber 260.

The combustion chamber 240 may operate at an elevated temperature. Once the wet recovered fly ash 120 is introduced into combustion chamber 240, it may be thermally treated. That is, wet recovered fly ash 120 enters the combustion chamber 240, is thermally treated, and exits the combustion chamber 240 as thermally treated fly ash 140. In some embodiments, the temperature of the combustion chamber 240 is at least 1000° F., at least 1200° F., or at least 1300° F. For example, the wet recovered fly ash may be thermally treated in the combustion chamber at a temperature of 1000° F. to 1300° F., 1000° F. to 1200° F., or 1150° F. to 1250° F. In some embodiments, the combustion chamber 240 is maintained at a treatment temperature of about 1000° F., about 1100° F., about 1200° F., or about 1300° F., wherein the temperature of the combustion chamber 240 deviates less than 100° F., less than 50° F., less than 30° F., less than 20° F., or less than 10° F. for the duration of treatment.

In one or more embodiments, the treatment time (the period of time starting when the wet recovered fly ash 120 enters the combustion chamber 240 to when the thermally treated fly ash 140 exits the combustion chamber 240) is at least 1 minute, at least 5 minutes, at least 10 minutes, at least 30 minutes, at least 45 minutes, at least an hour, at least 90 minutes, at least 2 hours, at least 3 hours, at least 4 hours, or at least 5 hours. For example, the treatment time may be 5 minutes to 1 hour, 10 minutes to 30 minutes, 30 minutes to 3 hours, 45 minutes to 2 hours, 45 minutes to 5 hours, or 2 hours to 5 hours. The thermal treatment may produce flue gases 145 and thermally treated fly ash 140.

Before the thermal treatment, during the thermal treatment, and/or after the thermal treatment of wet recovered fly ash 120, contact water 110 may be added to combustion chamber 240, e.g., to assist in controlling temperature.

Contact water 110 may be optionally heated, and the heating may be done before or after contact water 110 is passed to carbon burn out system 200. Additionally, or in the alternative, contact water 110 may be passed near combustion chamber 240 and absorb heat from combustion chamber 240. For example, the contact water 110 may pass through a cooling jacket (or other sleeve or similar apparatus) around combustion chamber 240. In either or both ways, contact water 110 may be used to control (e.g., lower) the temperature of combustion chamber 240 (e.g., the temperature used for thermal treatment of fly ash). In some embodiments where contact water 110 is introduced into combustion chamber 240, the temperature difference between the contact water 110 and the wet recovered fly ash 120 may be at least 20° F., at least 40° F., at least 50° F., at least 75° F., or at least 100° F. For example, the contact water 110 may have a temperature at least 20° F. to 200° F. lower than the temperature in the combustion chamber 240.

The thermally treated fly ash 140 may have a carbon content less than or equal to 8% by weight, such as, for example, less than or equal to 7% by weight, less than or equal to 6% by weight, less than or equal to 5% by weight, less than or equal to 4% by weight, less than or equal to 3% by weight, less than or equal to 2% by weight, less than or equal to 1% by weight, or less than or equal to 0.5% by weight, based on the total weight of the thermally treated fly ash 140. When the thermally treated fly ash 140 exits combustion chamber 240, the temperature of the thermally treated fly ash 140 may be 800° F. to 1300° F., e.g., at least in part by the cooling achieved from contact water 110. The thermally treated fly ash 140 may have a water content less than or equal to 8%, less than or equal to 5%, less than or equal to 3%, less than or equal to 2.5%, less than or equal to 2%, less than or equal to 1%, less than or equal to 0.5%, or less than 0.1% by weight, based on the total weight of the thermally treated fly ash 140. For example, the water content of the thermally treated fly ash 140 may be to 5% by weight, or 0.1% to 3% by weight, based on the total weight of the thermally treated fly ash 140.

The thermally treated fly ash 140 may be passed from the combustion chamber 240 to a mixing chamber 260 to be combined with wet recovered fly ash 120, contact water 110, and/or one or more other materials. Mixing chamber 260 may be configured to combine different materials (e.g., materials of different compositions, viscosities, and/or densities). For example, the mixing chamber 260 may be a ribbon mixer or a rotating drum. In some embodiments, contact water 110 may be used to control or adjust the temperature of mixing chamber 260, e.g., in a manner similar to controlling the temperature of combustion chamber 240. Additionally, or in the alternative, contact water 110 may be passed near mixing chamber 260 (e.g., in a cooling jacket) and absorb heat from mixing chamber 260.

The flue gases 145 that exit combustion chamber 240 (e.g., those produced in thermal treatment) may be passed into hot cyclone 250. Flue gases 145 may be bubbled through and/or sprayed with contact water 110. The hot cyclone 250 may separate the flue gases 145 into flue gas containing mostly hot fly ash of relatively smaller particle size 150 and comparatively large particle-sized fly ash 155. The hot fly ash 150 may be passed to mixing chamber 260, and the large-sized fly ash 155 may be passed to combustion chamber 240, e.g., for additional thermal treatment. Hot fly ash 150 may be mixed with contact water 110 prior to being introduced to combustion chamber 240. The differentiation between hot fly ash 150 (e.g., flue gas containing relatively smaller particle size) and large-sized fly ash 155 may depend on the content of recovered fly ash material 100 and/or the configuration of hot cyclone 250. The large-sized fly ash 155 may be combined with contact water 110 prior to entering combustion chamber 240. Alternatively, or in addition, large-sized fly ash 155 may be mixed with wet recovered fly ash 120 prior to entering combustion chamber 240.

The hot fly ash 150 may have a carbon content less than or equal to 20% by weight, less than or equal to 15% by weight, less than or equal to 12% by weight, less than or equal to 10% by weight, less than or equal to 8% by weight, such as less than or equal to 5% by weight, less than or equal to 3% by weight, less than or equal to 2% by weight, less than or equal to 1% by weight, or less than or equal to 0.5% by weight, based on the total weight of the hot low-carbon fly ash. As the hot low-carbon fly ash 150 exits hot cyclone 250, the temperature of the hot low-carbon fly ash 150 may be 800° F. to 1300° F., for example. In some embodiments, hot low-carbon fly ash 150 may be combined with contact water 110 and/or passed through contact water 110 before entering mixing chamber 260.

As described above, the thermally treated fly ash 140 may be combined with one or more of contact water 110, wet recovered fly ash 120, and hot fly ash 150 in mixing chamber 260 (and/or scrubber blowdown 165 as discussed below). The components introduced to mixing chamber 260 may be combined to produce fly ash product 190. In some embodiments, at least two components introduced into mixing chamber 260 may have a temperature difference of at least 20° F., at least 40° F., at least 50° F., at least 75° F., or at least 100° F. Mixing may produce emissions 160 (hot gases mixed with fine particulates, e.g., dust), which may be passed from mixing chamber 260 to a dust collector 270.

For example, the dust collector 270 may be used to separate the emissions 160 leaving mixing chamber 260 into hot gases 170 and dust 185. The dust 185 may be combined with, and form a part of, the fly ash product 190. In some embodiments, dust 185 may be reintroduced into mixing chamber 260. The hot gases 170 may contain certain species, such as trace metals and/or atmospheric pollutants (e.g., $SO_x$, $NO_x$, CO) not suitable for and/or undesirable for release into the atmosphere. For example the hot gases 170 may include trace metals from the fly ash (e.g., arsenic, selenium, boron, mercury, antimony, barium, beryllium, cadmium, chromium, lead, nickel, silver, and/or thallium). The hot gases 170 may be passed through a scrubber 290 to remove at least a portion of such contaminants. The scrubber 290 may use contact water 110 and/or one or more chemical reagents, such as, for example, ozone or alkaline agents (e.g., calcium or sodium compounds) to remove the contaminants from hot gases 170. After the hot gases 170 are processed by scrubber 290, treated gases 175 may exit the scrubber 290 for release into the atmosphere. Treated gases 175 may contain less than 0.5% by weight of contaminants such as trace metals, based on the total weight of treated gases 175. The remaining contact water 110, trace contaminants, and residual chemical reagents, collectively referred to as scrubber blowdown 165, optionally may be passed to mixing chamber 260. The scrubber blowdown 165 may be mixed with contact water 110 prior to entering mixing chamber 260.

In one or more embodiments, the fly ash product 190 may exit the system 200 having a temperature less than or equal to 1000° F., less than or equal to 800° F., less than or equal to 500° F., less than or equal to 300° F., less than or equal to 200° F., less than or equal to 100° F. such as a temperature of 100° F. to 1000° F., 250° F. to 500° F., 300° F. to 500° F., or 250° F. to 300° F.

The fly ash product 190 may meet desired specifications, e.g., chemical and/or physical properties. For example, the fly ash product 190 may have a water content less than or equal to 5% by weight, less than or equal to 4% by weight, less than or equal to 3% by weight, less than or equal to 2.5% by weight, less than or equal to 2% by weight, less than or equal to 1% by weight, less than or equal to 0.5% by weight, or less than or equal to 0.1% by weight. For example, the water content of the fly ash product 190 may be 0.01% to 5% by weight, 0.5% to 3% by weight, or 0.1% to 1% by weight, based on the total weight of the fly ash product 190. Additionally or alternatively, the fly ash product 190 may have a carbon content less than or equal to 8% by weight, less than or equal to 7% by weight, less than or equal to 6% by weight, less than or equal to 5% by weight, less than or equal to 4% by weight, or less than or equal to 3% by weight. For example, the carbon content of the fly ash product may be 3% to 8% by weight, 3% to 5% by weight, less than or equal to 5% by weight, less than or equal to 4% by weight, less than or equal to 3% by weight, less than or equal to 2% by weight, or less than or equal to 1% by weight, based on the total dry weight of the fly ash product 190. In some embodiments, fly ash product 190 conforms to the specifications recited in ASTM C618, which is hereby incorporated by reference in its entirety. The fly ash product 190 obtained as disclosed herein may be suitable for a variety of applications, such as, e.g., pozzolan for use in concrete, fillers in building materials, and construction materials.

Additional embodiments may be devised without departing from the basic scope thereof, and the scope thereof is determined by the claims that follow.

What is claimed is:

1. A system for forming a fly ash-containing product, the system comprising:
    a first stage configured for thermally treating a first portion of a fly ash-containing mixture to form a thermally treated mixture; and
    a second stage configured for cooling the thermally treated mixture utilizing a second portion of the fly ash-containing mixture to form the fly ash-containing product, wherein the fly ash-containing product is of lower carbon content than the fly ash-containing mixture, based on a total dry weight of the fly ash-containing product;
    wherein the system is configured to first separate the fly ash-containing mixture into the first portion and the second portion upstream of the first stage.

2. The system of claim 1, wherein the first stage involves a combustion chamber configured to expose the first portion of the fly ash-containing mixture to a temperature of at least 1,000° F.

3. The system of claim 1, wherein in the first stage, the first portion of the fly ash-containing mixture is exposed to a temperature of at least 1,000° F.

4. The system of claim 1, wherein in the first stage, the first portion of the fly ash-containing mixture is exposed to a temperature in the range of 1,000-1,300° F.

5. The system of claim 1, wherein the second stage involves a mixing chamber configured to mix the thermally treated mixture with the second portion of the fly ash-containing mixture.

6. The system of claim 5, wherein the mixing chamber involves at least one of: a ribbon mixer; and a rotating drum.

7. The system of claim 1, wherein in the second stage, the thermally treated mixture is cooled to a temperature of 500° F. or less.

8. The system of claim 1, wherein in the second stage, the thermally treated mixture is cooled to a temperature in the range of 200-500° F.

9. The system of claim 1, wherein the fly ash-containing product is in accordance with ASTM C618 standards, having a loss on ignition (LOI) in the range of 2-6%.

* * * * *